United States Patent
Kotecha et al.

(10) Patent No.: US 9,420,354 B2
(45) Date of Patent: Aug. 16, 2016

(54) OPTIMIZING MOBILE ELECTRONIC PROGRAM GUIDE DELIVERY

(75) Inventors: Lalit R. Kotecha, San Ramon, CA (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 54 days.

(21) Appl. No.: 13/238,387

(22) Filed: Sep. 21, 2011

(65) Prior Publication Data
US 2013/0074127 A1 Mar. 21, 2013

(51) Int. Cl.
| | | |
|---|---|---|
| H04N 7/173 | (2011.01) | |
| H04N 21/84 | (2011.01) | |
| H04N 21/414 | (2011.01) | |
| H04N 21/61 | (2011.01) | |
| H04N 21/647 | (2011.01) | |
| H04N 21/6405 | (2011.01) | |
| H04N 21/6408 | (2011.01) | |

(52) U.S. Cl.
CPC ......... *H04N 21/84* (2013.01); *H04N 21/41407* (2013.01); *H04N 21/6131* (2013.01); *H04N 21/64738* (2013.01); *H04N 21/64746* (2013.01); *H04N 21/6405* (2013.01); *H04N 21/6408* (2013.01)

(58) Field of Classification Search
CPC ............ H04N 21/41407; H04N 21/6405; H04N 21/64738; H04N 21/44204; H04N 21/2385; H04N 21/4126; H04N 21/26216; H04N 21/47202; H04N 7/17309; H04N 21/2383; H04N 21/6118; H04N 21/64761

USPC ....................... 725/37–62, 86–100
See application file for complete search history.

(56) References Cited

U.S. PATENT DOCUMENTS

| | | | |
|---|---|---|---|
| 8,032,914 B2 * | 10/2011 | Rodriguez | ................. 725/97 |
| 2005/0273833 A1 * | 12/2005 | Soinio | ................. 725/113 |
| 2005/0289618 A1 * | 12/2005 | Hardin | ....... H04L 12/5695 725/95 |
| 2007/0153820 A1 * | 7/2007 | Gould | ................. 370/432 |
| 2007/0244982 A1 * | 10/2007 | Scott, III | ...... H04N 5/44543 709/217 |
| 2008/0066125 A1 * | 3/2008 | Li et al. | ................. 725/97 |
| 2009/0310937 A1 * | 12/2009 | Ellis et al. | ................. 386/83 |
| 2011/0075612 A1 * | 3/2011 | Guo et al. | ................. 370/329 |

* cited by examiner

*Primary Examiner* — Pankaj Kumar
*Assistant Examiner* — Alazar Tilahun

(57) ABSTRACT

A network device may receive, via a network, a request for electronic program guide content, from a user device connected to the network, and monitor, a network condition (e.g., network congestion, user device location, etc.) corresponding to the network. The network device may determine, based on the network condition, whether to provide the electronic program guide content using a first radio frequency bandwidth corresponding to the network or a second radio frequency bandwidth corresponding to the network. The user device may communicate, via the network, the electronic program guide content using the first radio frequency bandwidth or the second radio frequency bandwidth. The first radio frequency bandwidth may correspond to unicast, multicast, or broadcast services, and the second radio frequency bandwidth may correspond to a different one of unicast, multicast, or broadcast services.

22 Claims, 6 Drawing Sheets

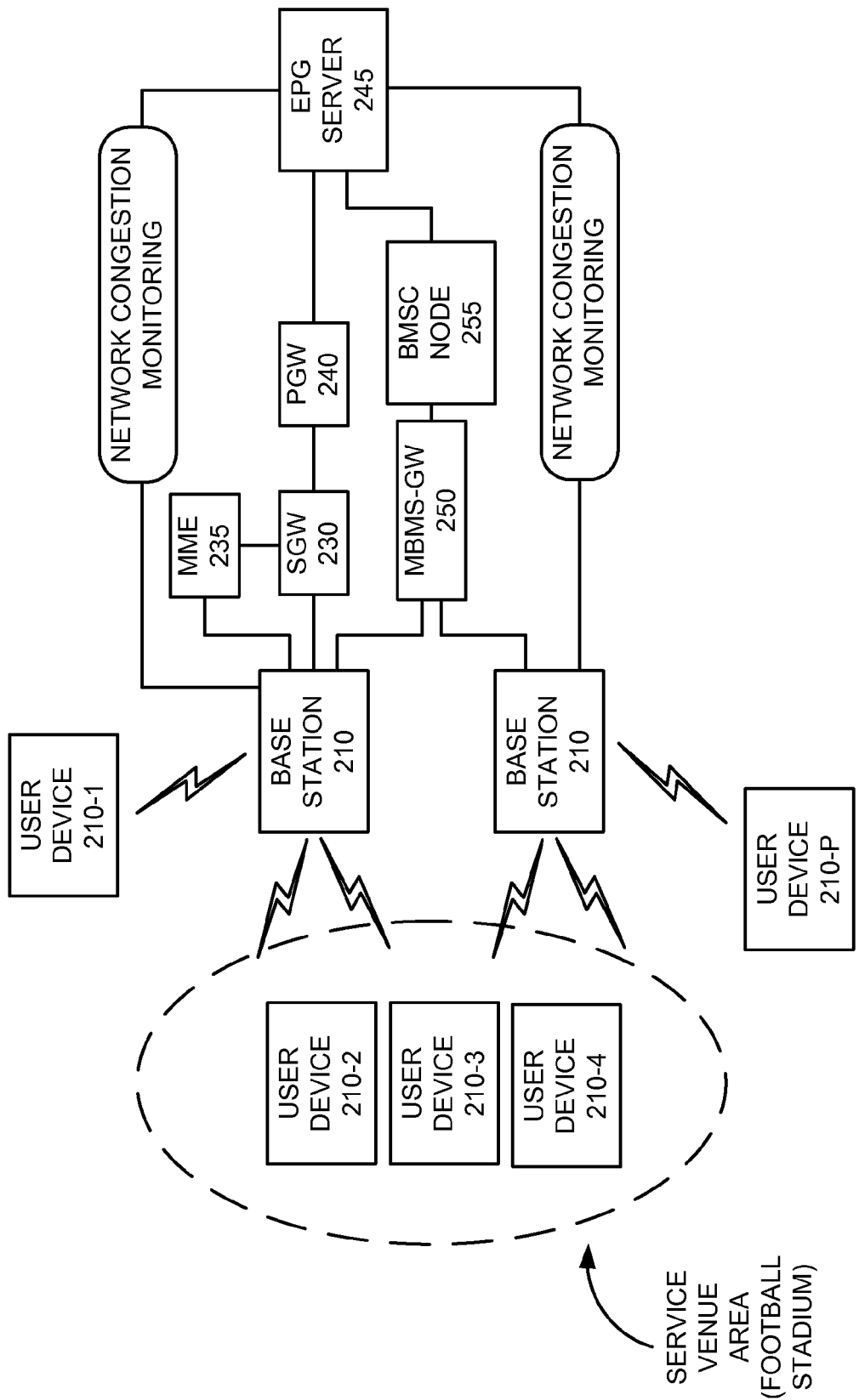

OPTIMIZING MOBILE ELECTRONIC PROGRAM GUIDE DELIVERY

BACKGROUND

Electronic programming may include multimedia content that is broadcasted to mobile devices in a particular geographic area, using one or more channels in a wireless network. In some instances, mobile device users may download a program guide that may inform the mobile device users about the programming that is, or will be, broadcasted over each channel. Examples of information that may be included in an electronic program guide may include a schedule of the program date, program time, program name, and channel corresponding to each broadcasted program. However, currently available solutions for delivering electronic program guides often include various deficiencies. For instance, in many scenarios, electronic program guides are delivered to mobile devices in a manner that is inefficient from a network resources perspective.

BRIEF DESCRIPTION OF THE DRAWINGS

FIG. 6 is a diagram of a system for optimizing EPG delivery according to one or more implementations described herein.

DETAILED DESCRIPTION OF PREFERRED EMBODIMENTS

The following detailed description refers to the accompanying drawings. The same labels and/or reference numbers in different drawings may identify the same or similar elements.

In one or more implementations, devices may be used to optimize the delivery of electronic program guides (EPGs) to user devices in a wireless network.

Figure 1:
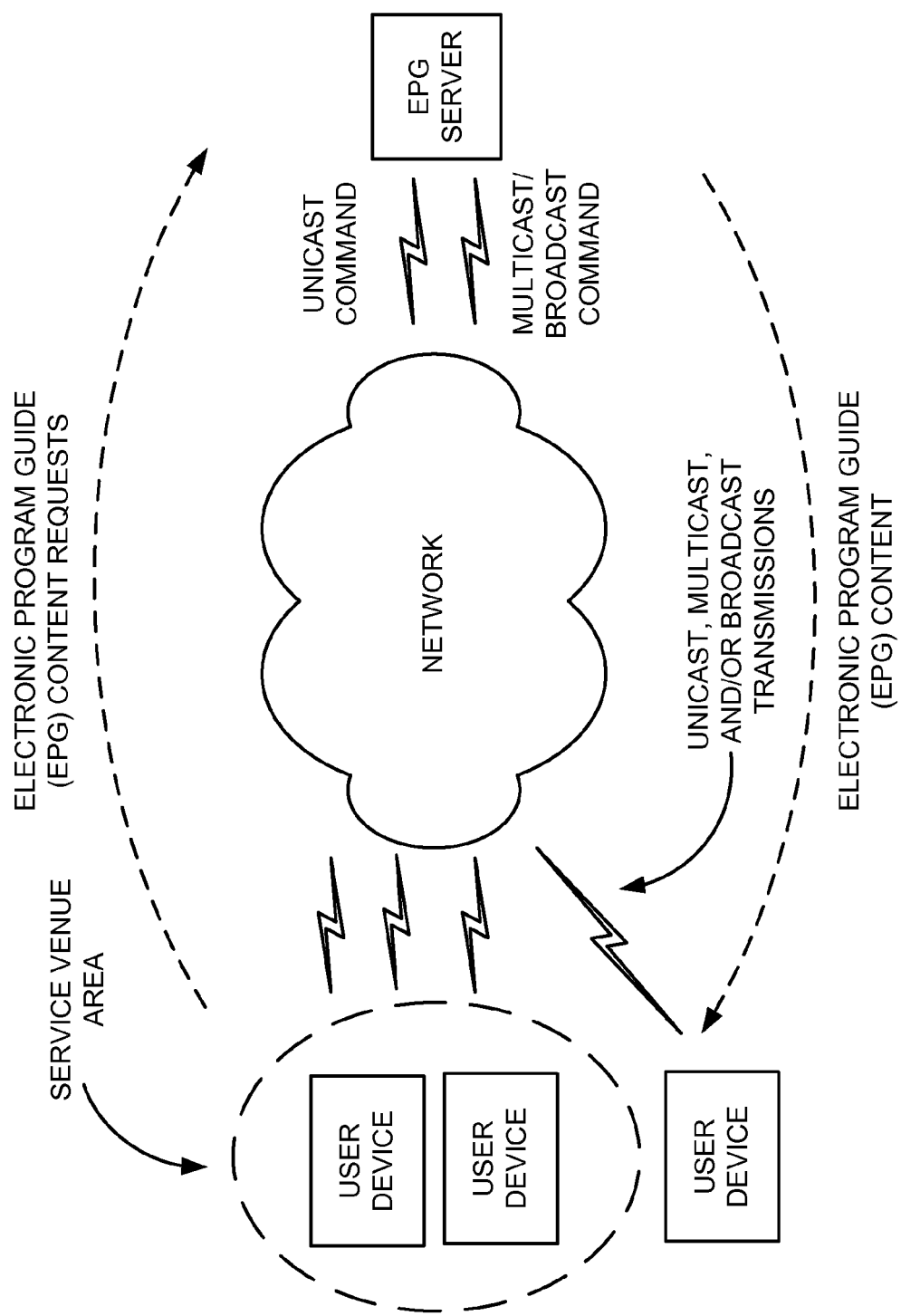
FIG. 1 is a diagram of an example overview of an implementation described herein.

FIG. 1 is a diagram of an example overview of an implementation described herein. An EPG server may receive requests for EPG content from user devices connected to a network and monitor network conditions corresponding to the network (e.g., network congestion, network resources, dates and times, whether the user devices are located within a service venue area (e.g., a stadium, an amusement park, etc.), the quantity of user devices within the service venue area, etc.). The EPG server may also, or alternatively, determine, based on the network conditions, whether to provide the EPG content to the user devices by using a first radio frequency bandwidth, a second radio frequency bandwidth, or both the first radio frequency bandwidth and the second radio frequency bandwidth. The first radio frequency bandwidth may correspond to a first transmission service (e.g., a unicast transmission service, a multicast transmission service, a broadcast transmission service, etc.), and the second radio frequency bandwidth may correspond to a second transmission service (e.g., a unicast transmission service, a multicast transmission service, a broadcast transmission service, etc.) that is different from the first transmission service. Additionally, or alternatively, the EPG server may communicate the EPG content using the first radio frequency bandwidth or the second radio frequency bandwidth.

In some implementations, user devices outside of the service venue area may only receive EPG content via unicast transmission services and user devices inside the service venue area may receive EPG content via multicast and/or broadcast transmission services. In some implementations, whether a particular user device receives EPG content via unicast or multicast/broadcast transmission services may depend on a quantity of user devices connected to the network and interested in receiving EPG content. In such implementations, the EPG server may keep track of the quantity of user devices in the services area and interested in receiving EPG content or capable of receiving EPG content using multicast/broadcast transmission services. In certain implementations, a user device inside of the service venue area may receive EPG content via unicast transmission services if the user device requests EPG content in between periodic multicast/broadcast transmissions of EPG content.

Accordingly, the EPG server may optimize EPG content delivery by using different radio frequency bandwidths and by using different types of transmission services, depending on network conditions. For example, in an implementation where the first radio frequency bandwidth is dedicated for unicast transmission services and the second radio frequency bandwidth is dedicated for multicast/broadcast transmission services, the EPG server may communicate EPG content to the user devices using the first radio frequency bandwidth (e.g., unicast transmission services) when network congestion is low, when only a few user devices have requested the EPG content, or when the user devices are located outside of the service venue area. However, when network congestion is high or when a large quantity of user devices have requested the EPG content and the user devices are located within the service venue area, the EPG server may communicate EPG content to the user devices using the second radio frequency bandwidth (e.g., broadcast transmission services). Accordingly, the capability of the EPG server to work with network conditions, multiple radio frequency bandwidths, and multiple transmission services may enable the EPG server to optimize the delivery of EPG content to the user devices.

EPG content, as used herein, may include any variety or combination of information relating to the transmission of media-based programs. Examples of EPG content may include program titles, program descriptions, program statistics (e.g., the number of times a video or program has been accessed or requested), program ratings, program reviews, program broadcast dates, program broadcast times, program broadcast channels, program images, program videos, and/or other types of information relating to media-based programs communicated to user devices in a wireless network. Examples of media-based programs may include music, concerts, radio programs, television programs, videos, shows, movies, and/or one or more other types of media-based programs.

Figure 2:
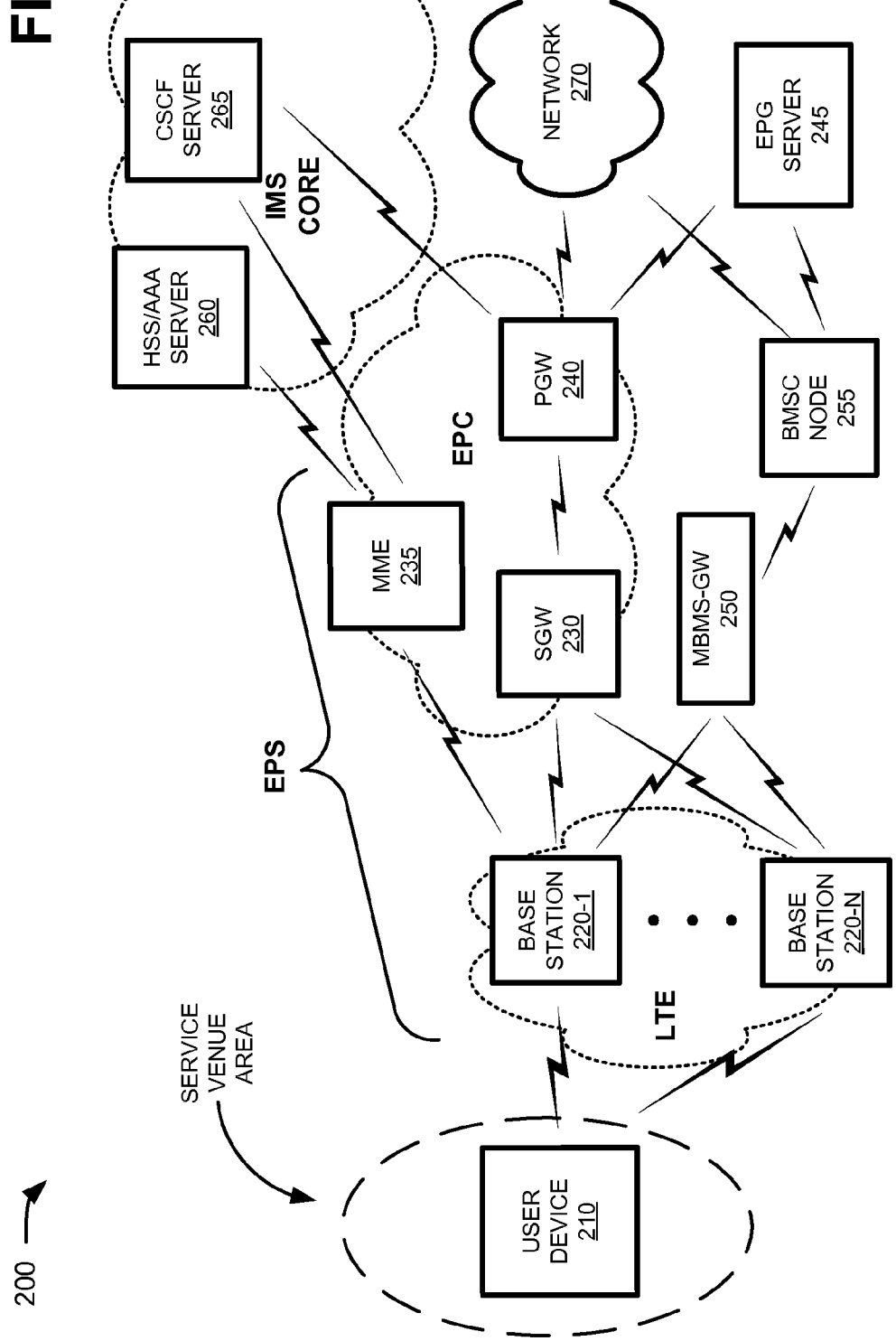
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a group of base stations 220-1, . . . , 220-N (where N≥1) (hereinafter referred to collectively as "base stations 220" and individually as "base station 220"), a serving gateway 230 (hereinafter referred to as "SGW 230"), a mobility management entity device 235

(hereinafter referred to as "MME 235"), a packet data network (PDN) gateway (PGW) 240, EPG server 245, MBMS-GW 250, BMSC node 255, a home subscriber server (HSS)/authentication, authorization, accounting (AAA) server 260 (hereinafter referred to as an "HSS/AAA server 260"), a call session control function (CSCF) server 265 (hereinafter referred to as "CSCF server 265"), and a network 270. The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2.

Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Implementations are described as being performed within a RAN that is based on a long term evolution (LTE) network for explanatory purposes. In other implementations, the implementations may be performed within a RAN that is not based on a LTE network.

Environment 200 may include an evolved packet system (EPS) that includes a LTE network and/or an evolved packet core (EPC) that operate based on a third generation partnership project (3GPP) wireless communication standard. The LTE network may be a RAN that includes one or more base stations 220 that take the form of evolved Node Bs (eNBs) via which user devices 210 communicate with the EPC. The EPC may include SGW 230, MME 235, and/or PGW 240 that enable user devices 210 to communicate with network 270 and/or an Internet protocol (IP) multimedia subsystem (IMS) core. The IMS core may include HSS/AAA server 260 and/or CSCF server 265 and may manage authentication, session initiation, account information, profile information, etc. associated with user devices 210.

User device 210 may include any computation or communication device, such as a wireless mobile communication device that is capable of communicating with base station 220 and/or a network (e.g., network 270). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 210 may send traffic to and/or receive traffic from network 270.

Base station 220 may include one or more devices that receive, process, and/or transmit traffic, such as audio, video, text, and/or other data, destined for and/or received from user device 210. In an example implementation, base station 220 may be an eNB associated with the LTE network that receives traffic from and/or sends traffic to network 270 via SGW 230 and PGW 240. Base station 220 may send traffic to and/or receive traffic from user device 210 via an air interface. In another example, one or more other base stations 220 may be associated with a RAN that is not associated with the LTE network.

SGW 230 may include one or more computation or communication devices that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 230 may aggregate traffic received from one or more base stations 220 associated with the LTE network, and may send the aggregated traffic to network 270 (e.g., via PGW 240) and/or other network devices associated with the IMS core and/or the EPC. SGW 230 may also receive traffic from the other network devices and/or may send the received traffic to user device 210 via base station 220. SGW 230 may perform operations associated with handing off user device 210 from and/or to the LTE network.

MME 235 may include one or more computation or communication devices that gather, process, search, store, and/or provide information in a manner described herein. For example, MME 235 may perform operations associated with handing off user device 210, from a first base station 220 to a second base station 220, when user device 210 is exiting a cell associated with the first base station 220. MME 235 may, in yet another example, perform an operation to handoff user device 210 from the second base station 220 to the first base station 220 when user device 210 is entering the cell associated with first base station 220.

PGW 240 may include one or more computation or communication devices that gather, process, search, store, and/or provide information in a manner described herein. PGW 240 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 240 may include a device that aggregates traffic received from one or more SGWs 230, etc. and may send the aggregated traffic to network 270. In another example implementation, PGW 240 may receive traffic from network 270 and may send the traffic toward user device 210 via SGW 230.

EPG server 245 may include one or more of a variety of computing devices. For example, EPG server 245 may include a server, a cluster of servers, or one or more other types of computing or communication devices. EPG server 245 may store, or otherwise have access to, EPG data (e.g., data corresponding to one or more versions of one or more EPGs). EPG server 245 may be capable of receiving requests for EPG content from user device 210. EPG server 245 may also, or alternatively, monitor network conditions corresponding to user device 210 and/or, one or more devices of the LTE network, the EPS network, the EPC network, and/or the IMS network. As mentioned above, examples of network conditions may include a level of network activity, a level of network congestion, a period of time corresponding to peak network usage hours, a period of time corresponding to off-peak network usage hours, a location of user device 210 relative to the service venue area, etc.

Additionally, or alternatively, EPG server 245 may analyze network conditions and determine how EPG content should be transmitted to user device 210. For instance, EPG server 245 may decide whether the EPG content should be transmitted to user device 210 via a unicast transmission services a multicast transmission service, or a broadcast transmission service. In some implementations, the transmission services may be allocated to one or more radio frequency bandwidths.

For instance, in some implementations, one radio frequency bandwidth may be dedicated to broadcasting EPG content, while another radio frequency bandwidth may be dedicated to unicasting EPG content. In such examples, the radio frequency bandwidth dedicated to broadcasting EPG content may be used to broadcast EPG content periodically (e.g., every 5 minutes), according to a schedule (e.g., between 7 PM and 9 PM), and/or according to one or more other types of conditions. By contrast, the radio frequency bandwidth dedicated to unicasting EPG content may, for example, be subject to another condition, such as the unicast transmission services only being available when network congestion is below a particular threshold.

EPG server 245 may also, or alternatively, communicate EPG content to user device 210. For example, EPG server 245 may communicate EPG content via PGW 240, SGW 230, and base station 220 to communicate EPG content via unicast transmission services. Additionally, or alternatively, EPG server 245 may communicate EPG content via BMSC node 255, MBMS-GW 250, and base station 220 to communicate EPG content via multicast transmission services and/or broadcast transmission services.

MBMS-GW 250 may include one or more computation or communication devices that gather, process, search, store, and/or provide information in a manner described herein. MBMS-GW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. For example, MBMS-GW 250 may provide connectivity between one or more base stations 220 and other network devices (e.g., BMSC node 255) for broadcasting and/or multicasting programming content, EPG content, or other types of data to user devices 210. For instance, in some implementations, MBMS-GW 250 may include a device that aggregates traffic received from one or more BMSC nodes 255 and may send the aggregated traffic to one or more base stations 220 for broadcasting and/or multicasting.

BMSC node 255 may include one or more computation or communication devices that gather, process, search, store, and/or provide information in a manner described herein. BMSC node 255 may receive EPG content from EPG server 245 and format the EPG content for broadcasting and/or multicasting the EPG content to user devices 210 via MBMS-GW 250 and one or more base stations 220. In another example, BMSC node 255 may retrieve programming content and/or other types of content from network 270 (e.g., a content delivery network (CDN)), format the programming content for broadcasting and/or multicasting, and provide the EPG content to one or more base stations 220 for delivery to user devices 210. Additionally, or alternatively, BMSC node 255 may provide other services, such as digital rights management (DRM) services, relating to EPG content, programming content, or another type of content provided to user devices 210.

HSS/AAA server 260 may include one or more server devices, or other types of computation or communication devices, that gather, process, search, store, and/or provide information in a manner described herein. For example, HSS/AAA server 260 may manage, update, and/or store, in a memory associated with HSS/AAA server 260, profile information associated with user device 210 that identifies applications and/or services that are permitted for and/or accessible by user device 210, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with user device 210.

CSCF server 265 may include one or more server devices, or other types of computation or communication devices, that gather, process, search, store, and/or provide information in a manner described herein. CSCF server 265 may process and/or route calls (e.g., voice over Internet Protocol (IP) calls) to and from user device 210 via the EPC. For example, CSCF server 265 may process calls, received from network 270, that are destined for user device 210. In another example, CSCF server 265 may process calls, received from user device 210, that are destined for network 270.

Network 270 may include one or more wired and/or wireless networks. For example, network 270 may include a cellular network, a public land mobile network (PLMN), a second generation (2G) network, a 3G network, a 4G network, a fifth generation (5G) network, and/or another network. Additionally, or alternatively, network 270 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

While implementations described herein are described primarily in the context of broadband services via LTE, other wireless standards may be used. For example, components conforming to LTE standards described herein may be replaced by components conforming to other network standards (e.g., GSM, WCDMA, UMB, UMTS, CDMA2000, HSPA, 802.11, or other network standards).

Figure 3:
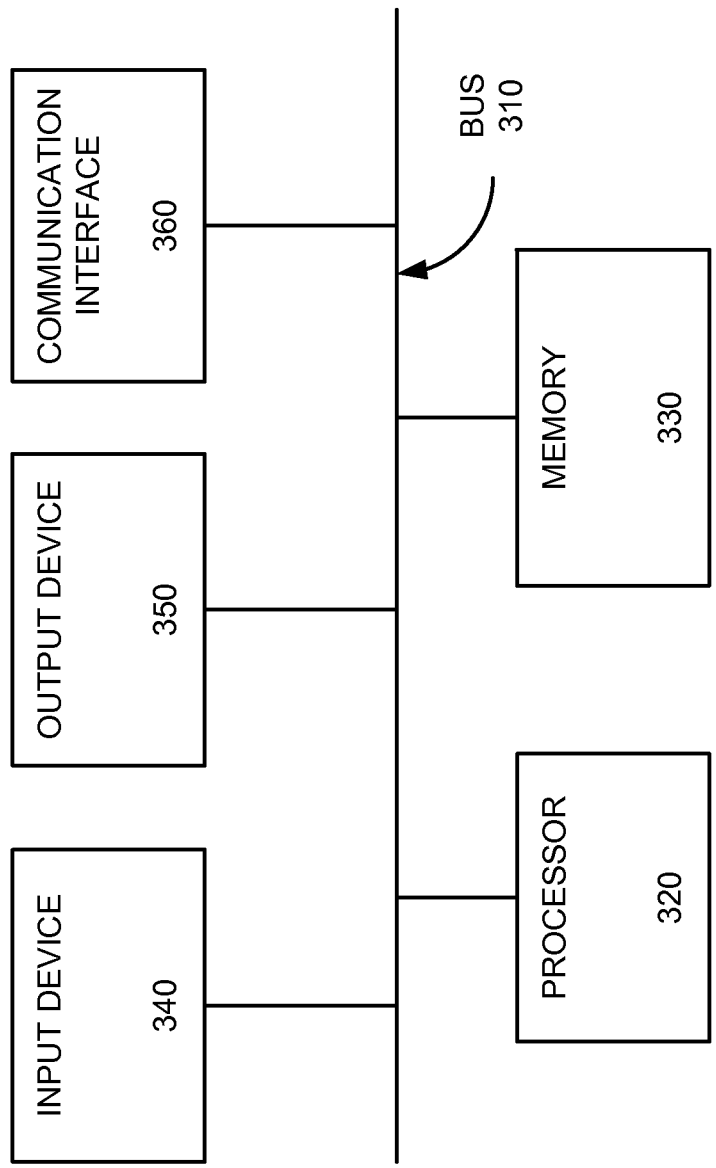
FIG. 3 is a diagram of example components of a device of FIG. 2.

FIG. 3 is a diagram of example components of a device 300 according to one or more implementations described herein. In certain implementations, device 300 may correspond to one or more of the devices depicted in FIG. 2. For example, device 300 may correspond to user device 210, SGW 230, MME 235, PGW 240, EPG server 245, MBMS-GW 250, BMSC node 255, HSS/AAA server 260, and/or CSCF server 265. Additionally, each of user device 210, EPG server 245, SGW 230, HSS 240, MME 250, PGW 260, MBMS-GW 250, or BMSC node 255 may include one or more devices 300 or one or more components of device 300.

As depicted, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems and/or communication paths that enable communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system, and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
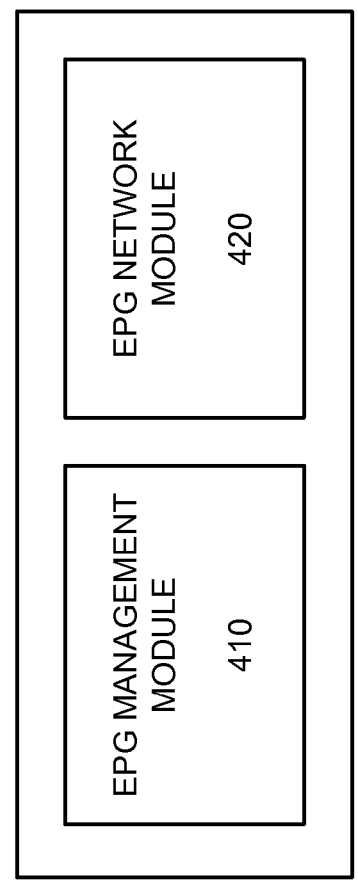
FIG. 4 is a diagram of example functional components of an electronic program guide (EPG) server according to one or more implementations described herein.

FIG. 4 is a diagram of example functional components of EPG server 245 according to one or more implementations described herein. As illustrated, EPG server 245 may include EPG management module 410 and EPG network module 420. Depending on the implementation, one or more of modules 410-420 may be implemented as a combination of hardware and software based on the components illustrated and described with respect to FIG. 3. Alternatively, modules 410-420 may each be implemented as hardware based on the components illustrated and described with respect to FIG. 3.

EPG management module 410 may provide functionality with respect to managing EPG content. For example, EPG management module 410 may enable EPG server 245 to receive EPG content and store EPG content. As mentioned above, EPG content may include any variety or combination of information relating to media-based programs. For instance, EPG content may include program titles, program descriptions, program statistics (e.g., the number of times a video or program has been accessed), program ratings, program reviews, program broadcast dates, program broadcast times, program broadcast channels, images, videos, and/or other types of information relating to programs communicated to user device 210.

EPG network module 420 may provide functionality with respect to communicating EPG content data. For example, EPG network module 420 may enable EPG server 245 to receive a request for electronic program guide content from user device 210 and monitor network conditions corresponding to the network. In some implementations, the network conditions may include a level of network congestion corresponding to an access network of the network or another portion of the network. As mentioned above, additional examples of network conditions may include a period of time corresponding to the network (e.g., a period of time corresponding to peak network usage hours, a period of time corresponding to off-peak network usage hours, etc.), a location of user device 210 relative to a service venue area, or another type of condition relating to the network and/or user device 210.

EPG network module 420 may also, or alternatively, enable EPG server 245 to determine whether to provide the electronic program guide content using a first radio frequency bandwidth or a second radio frequency bandwidth. In some implementations, EPG server 245 may enable this determination to be based on a variety of one or more factors, such as a level of network congestion corresponding to the network or another type of network condition corresponding to the network. Additionally, or alternatively, the first radio frequency bandwidth and the second radio frequency bandwidth may correspond to a first transmission service and a second transmission service, respectively. For instance, the first transmission service and/or the second transmission service may each correspond to any one of a unicast transmission service, a multicast transmission service, and/or a broadcast transmission service. In some implementations, the first radio transmission service and the second radio transmission services may each correspond to a different type of radio transmission service.

EPG network module 420 may also, or alternatively, enable EPG server 245 to communicate the EPG content using the first radio frequency bandwidth or the second radio frequency bandwidth. As such, EPG network module 420 may enable EPG server 245 to optimize the delivery of EPG content by, for example, using unicast services to deliver EPG content to user devices when network congestion is low, and, when network congestion is high, using multicast and/or broadcast services to deliver EPG content to user devices 210.

In addition to the functionality described above, functional components of EPG server 245 may also, or alternatively, provide functionality as described elsewhere in this specification. While FIG. 4 shows a particular number and arrangement of modules, in alternative implementations, EPG server 245 may include additional modules, fewer modules, different modules, or differently arranged modules than those depicted.

Figure 5:
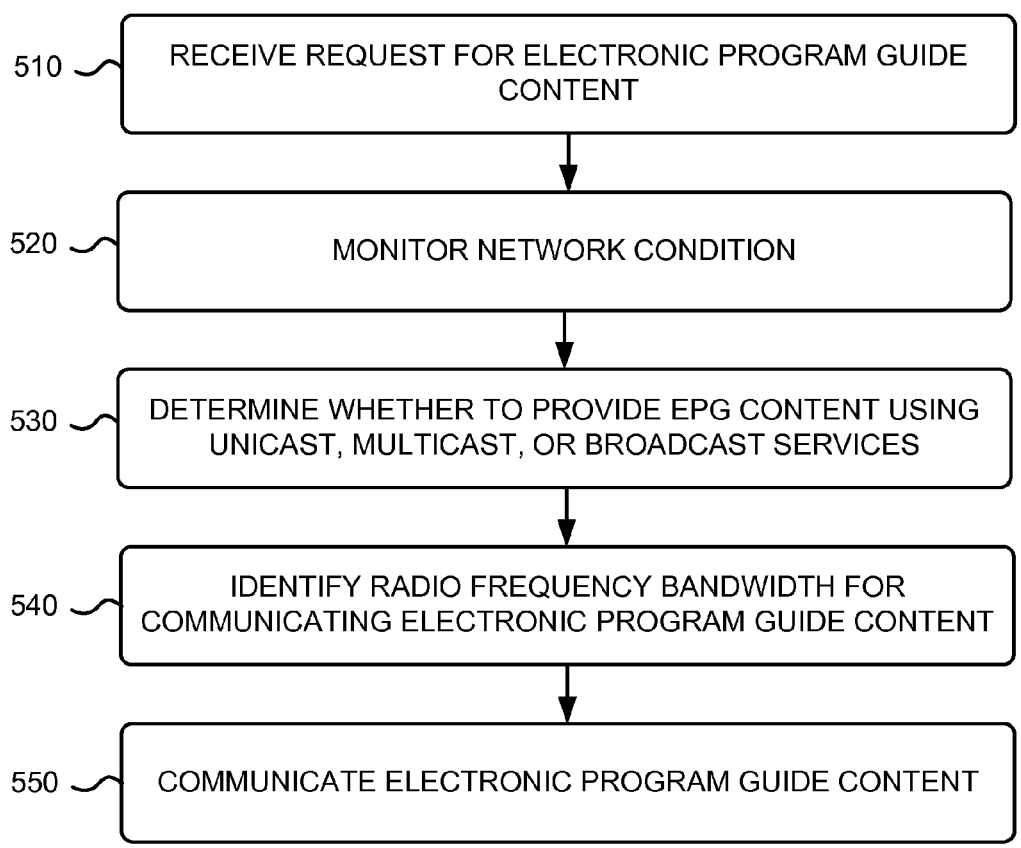
FIG. 5 is a diagram of an example process for optimizing EPG delivery according to one or more implementations described herein.

FIG. 5 is a diagram of an example process 500 for optimizing EPG delivery according to one or more implementations described herein. In one or more implementations, process 500 may be performed by one or more components of EPG server 245. In other implementations, one or more blocks of process 500 may be performed by one or more other components/devices, or a group of components/devices, including or excluding EPG server 245.

A request for EPG content may be received (block 510). For example, EPG server 245 may receive a request from user device 210 for EPG content data. In certain implementations, the request for EPG content may be received from user device 210 in response to, for example, EPG server 245 notifying user device 210 that EPG content data is available. As mentioned above, user device 210 may be located within a service venue area, such as a stadium, an athletic arena, an amusement park, a shopping center, or one or more other types of geographical areas. In some implementations, the location of user device 210 may be relevant to whether EPG content is unicasted, multicasted, or broadcasted to user device 210.

Network conditions may be monitored (block 520). For example, EPG server 245 may monitor network conditions corresponding to the network. In some implementations, network conditions information may be collected by another network device, such as one or more base stations 210, SGW 230, MME 235, PGW 240, HHS/AAA server 260, CSCF server 265, and/or one or more other types of network devices, and transmitted to EPG server 245 for analysis. As mentioned above, the network conditions monitored may correspond to one or more of a variety of circumstances relating to the network. For instance, EPG server 245 may monitor a load condition of the network (e.g., a level of network activity, a level of network congestion, etc.), a period of time corresponding to the network (e.g., a period of time corresponding to peak network usage hours, a period of time corresponding to off-peak network usage hours, etc.), a location of user device 210 relative to a service venue area, or another type of condition relating to the network and/or user device 210.

A determination may be made whether to provide EPG content using unicast, multicast, or broadcast services (block 530). For example, EPG server 245 may consider the network conditions and make a determination whether to provide EPG content to user devices 210 via unicast transmission services, multicast transmission services, or broadcast transmission services. As mentioned above, EPG server 245 may determine which type of transmission service to use (e.g., unicast services, multicast services, or broadcast services) based on the network conditions monitored.

For example, EPG server 245 may consider a level of network congestion corresponding to one or more networks and/or network devices. Doing so may enable EPG server 245 to determine whether EPG delivery would be more optimized by using a unicast transmission service, a multicast transmission service, and/or a broadcast transmission service. Similarly, EPG server 245 may consider a geographic location corresponding to one or more user devices 110 requesting the EPG content. Such a consideration may be made with reference to whether the user devices are locate inside of the service venue area or outside of the service venue area. Doing so may enable EPG server 245 to identify the network resources (e.g., the radio frequency bandwidths, the types of transmission services, processing capacity, etc.) that could be used to respond to the requesting user device 110. Other examples of network conditions that may be considered by EPG server 245 are discussed below with reference to FIG. 6.

However, EPG server 245 may also, or alternatively, consider additional factors as well, such as a schedule set forth by a network operator, instructions received from a network operator, a quantity of user devices 210 that have responded to a notice or an advertisement message (e.g., a simple message service (SMS) message) regarding EPG content, a quantity of requests for EPG content from user devices within a particular geographic area, a quantity of requests for EPG content relative to a particular period of time, or one or more other types of factors.

A radio frequency bandwidth may be identified for communicating EPG content (block 540). For example, EPG server 245 may identify an appropriate radio frequency bandwidth for communicating EPG content. In some implementations, EPG server 245 may choose between multiple radio frequency bandwidths for communicating the EPG content. In some implementations, EPG server 245 may be capable of selecting between a radio frequency bandwidth dedicated for unicast transmission services and another radio frequency bandwidth dedicated for multicast transmission services or broadcast transmission services. In other implementations, EPG server 245 may be capable of selecting between multiple radio frequency bandwidths (e.g., more than two radio frequency bandwidths) for communicating EPG content via unicast transmission services, multicast transmission services, or broadcast transmission services.

EPG content may be communicated (block 550). For example, EPG server 245 may cause the EPG content, requested by one or more user devices 210, to be communicated over the network using unicast transmission services, multicast transmission services, and/or broadcast transmission services. User devices 210 may use the EPG content to inform users of user devices 210 regarding programming content that is broadcasted in the service venue area.

While FIG. 5 shows a flowchart diagram of an example process 500 for optimizing EPG delivery, in other implementations, a process for optimizing EPG delivery may include fewer operations, different operations, differently arranged operations, or additional operations than depicted in FIG. 5.

FIG. 6 is a diagram of a system 600 for optimizing EPG delivery according to one or more implementations described herein. As depicted, system 600 may include user devices 210-1, 210-2, 210-3, 210-4, . . . , 210-P (where P≥1) (hereinafter referred to collectively as "user devices 210" and individually as "user device 210"), base stations 210, SGW 230, MME 235, PGW 240, EPG server 245, MBMS-GW 250, and BMSC node 255. The devices of FIG. 6 are discussed above with reference to FIG. 2. These devices are depicted again in FIG. 6 to illustrate a possible arrangement of the devices and to provide a reference for the examples discussed below.

Let us assume that the service venue area depicted in FIG. 6 corresponds to a football stadium. Let us also assume that user device 210-1 is located in a nearby parking garage, user devices 210-2, 210-3, and 2104-4 are located inside the football stadium, and user device 210-P is located in a vehicle driving near the football stadium. Let us also assume that base stations 210 broadcast multiple channels of programming content within the football stadium.

In such a scenario, EPG server 245 may optimize the delivery of EPG content to user devices 210 by periodically broadcasting EPG content to user devices 210 inside of the football stadium, but unicasting EPG content to user devices 210 outside of the football stadium. Additionally, or alternatively, EPG server 245 may unicast EPG content to user devices 210 inside the football stadium when the level of network congestion is below a particular threshold, which may be derived from the network congestion monitoring performed at base stations 210. In some implementations, EPG server 245 may unicast EPG content to user devices 210 by communicating with base stations 210 via PGW 260 and SGW 230. By contrast, EPG server may multicast or broadcast EPG content to user devices 210 by communicating with base stations 210 via BMSC node 255 and MBMS-GW 250. As such, EPG server 245 may be capable of optimizing the delivery of EPG content to user device 210 by selecting different transmission services based on factors, such as a geographic location of user device 210 and/or a level of network congestion.

In some implementations, the EPG content may be unicasted, multicasted, and/or broadcasted over the same radio frequency bandwidth. While in other implementations, the EPG content may use one radio frequency bandwidth to unicast EPG content, another radio frequency bandwidth to multicast EPG content, and yet another radio frequency bandwidth to broadcast EPG content. In yet other implementations, the EPG content may be unicasted, multicasted, and/or broadcasted over multiple radio frequency bandwidths. Accordingly, EPG server 245 may manage multiple radio frequency bandwidths for delivering EPG content to user devices 210.

EPG server 245 may also, or alternatively, provide different types of EPG content to different user devices 210. For example, in order to conserve network resources, the EPG content unicasted to user devices 210-1 and 210-P might be a simple, text-based version of the EPG content. However, if EPG server 245 is broadcasting EPG content inside the football stadium, the EPG content may include additional information or various types of content (e.g., images, audio, video, etc.). As such, EPG server 245 may also optimize the delivery of EPG content by providing different types of EPG content to different user devices 210.

In light of the above, network devices may be used to optimize the delivery of EPG content (e.g., EPGs) to user devices 210. For instance, EPG server 245 may receive a request for EPG content from user device 210, via a network, and monitor network conditions (e.g., network congestion, date and time, location of user devices 210, quantity of user devices, etc.) corresponding to the network. EPG server 245 may also, or alternatively, determine whether to provide EPG content to user device 210, using a first radio frequency bandwidth or a second radio frequency bandwidth. The first radio frequency bandwidth may correspond to a first transmission service (e.g., a unicast transmission service, a multicast transmission service, a broadcast transmission service, etc.) and the second radio frequency bandwidth may correspond to a second transmission service (e.g., a unicast transmission service, a multicast transmission service, a broadcast transmission service, etc.) based on, for example, the location of user devices 210. In some implementations, the first radio transmission service and the second radio transmission services may each correspond to a different type of radio transmission service.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

While described in terms of providing EPG content, one or more of the implementations described herein may also, or alternatively, apply to other forms of content, such as video information, audio information a combination of audio and video information, or another type of content.

What is claimed is:

1. A method comprising:
   receiving, by a network device and via a network, a request for electronic program guide content from a user device connected to the network,
      the user device including a wireless mobile communication device;
   monitoring, by the network device, a network condition corresponding to the network,
      the network condition comprising a network congestion associated with the network;
   determining, by the network device and based on the network condition, whether to provide the electronic program guide content using a first radio frequency bandwidth or using a second radio frequency bandwidth;
   communicating, by the network device and via the network, the electronic program guide content using a first transmission service that comprises the first radio frequency bandwidth when the network congestion has not exceeded a threshold;
   communicating, by the network device and via the network, the electronic program guide content using a second transmission service that comprises the second radio frequency bandwidth, when the network congestion has exceeded the threshold,
      the first radio frequency bandwidth corresponding to a unicast service, and
      the second radio frequency bandwidth corresponding to at least one of a multicast service or a broadcast service; and
   disabling, by the network device, the first transmission service when the network congestion associated with the network has exceeded the threshold.

2. The method of claim 1, where the network condition further comprises a current time relative to a period of time corresponding to peak network activity or the current time relative to a transmission schedule received from a network operator.

3. The method of claim 1, where determining whether to provide the electronic program guide content comprises:
   determining that the network congestion associated with the network has exceeded the threshold.

4. The method of claim 1, where determining whether to provide the electronic program guide content comprises:
   determining that the network congestion associated with the network has not exceeded the threshold.

5. The method of claim 1, where the network condition further comprises a location of the user device relative to a service venue area, and
   where determining whether to provide the electronic program guide content includes:
      determining whether to provide the electronic program guide content using the first radio frequency bandwidth or the second radio frequency bandwidth based on the location of the user device relative to the service venue area.

6. The method of claim 1, further comprising:
   communicating electronic program guide availability data to the user device,
      the electronic program guide availability data comprising information regarding availability of an electronic program guide; and where receiving the request for the electronic program guide content includes:
receiving the request for the electronic program guide content based on communicating the electronic program guide availability data to the user device.

7. The method of claim 1, where the electronic program guide content identifies at least one of:
a plurality of scheduled programming information,
a plurality of scheduled programming dates,
a plurality of scheduled programming times, or
a plurality of channels that correspond to the plurality of scheduled programming information.

8. The method of claim 1, where:
the network condition further comprises a location of the user device relative to a service venue area,
the unicast service is used to transmit the electronic program guide content to user devices located outside of the service venue area or to user devices located within the service venue area and that have requested the electronic program guide content in between scheduled broadcast services, and
the broadcast service is used to transmit the electronic program guide content to user devices located within the service venue area.

9. The method of claim 1, where the network condition further comprises one or more of:
a geographic location of the user device relative to a service venue area, or
a quantity of requests from user devices for the electronic program guide content over a particular time interval.

10. A network device comprising:
a processor to:
receive, via a network, a request for electronic program guide content from a user device connected to the network,
the electronic program guide content comprising content information corresponding to an electronic program guide stored by the network device,
the user device including a wireless mobile communication device;
monitor one or more network conditions corresponding to the network,
the one or more network conditions comprising a network congestion associated with the network;
determine, based on the network conditions, whether to provide the electronic program guide content using a first radio frequency bandwidth or using a second radio frequency bandwidth;
communicate, via the network, the electronic program guide content using the first radio frequency bandwidth when the network congestion has not exceeded a threshold,
the first radio frequency bandwidth corresponding to a unicast service; and
communicate, via the network, the electronic program guide content using the second radio frequency bandwidth when the network congestion has exceeded the threshold,
the second radio frequency bandwidth corresponding to a transmission service different than the unicast service,
the unicast service being disabled when the network congestion has exceeded the threshold.

11. The network device of claim 10, where the second radio frequency bandwidth corresponds to one of:
a multicast service, or
a broadcast service.

12. The network device of claim 10, where, when determining whether to provide the electronic program guide content, the processor is to:
determine that the network congestion, associated with the network, has exceeded the threshold.

13. The network device of claim 12, where, when communicating the electronic program guide content using the second radio frequency bandwidth, the processor is to:
determine that the network congestion has exceeded the threshold; and
communicate the electronic program guide content using a multi-cast service or a broadcast service.

14. The network device of claim 10, where the one or more network conditions further comprise a location of the user device relative to a service venue area, and
where the processor is further to:
determine whether to provide the electronic program guide content using the first radio frequency bandwidth or using the second radio frequency bandwidth based on the location of the user device relative to the service venue area.

15. The network device of claim 10, where the processor is further to:
communicate electronic program guide availability data to the user device,
the electronic program guide availability data comprising information regarding availability of the electronic program guide, and
where, when receiving the request for the electronic program guide content, the processor is to:
receive the request for the electronic program guide content based on communicating the electronic program guide availability data.

16. The network device of claim 10, where:
the one or more network conditions further comprise a location of the user device relative to a service venue area,
the unicast service is used to transmit the electronic program guide content to user devices located outside of the service venue area, and
a broadcast service, corresponding to the second radio frequency bandwidth, is used to transmit the electronic program guide content to user devices located within the service venue area.

17. The network device of claim 10, where the one or more network conditions further comprise one or more of:
a geographic location of the user device relative to a service venue area,
a current time relative to a transmission schedule received from a network operator, or
a quantity of requests from user devices for the electronic program guide content over a particular time interval.

18. One or more non-transitory computer-readable storage media storing instructions, the instructions comprising:
one or more instructions that, when executed by a processor, cause the processor to:
receive, via a network, a request for electronic program guide content from a user device connected to the network
the user device including a wireless mobile communication device;
monitor a network condition associated with the network,
the network condition comprising a network congestion associated with the network;
determine, based on the network condition, whether to provide the electronic program guide content using a first radio frequency bandwidth or using a second radio frequency bandwidth,
the first radio frequency bandwidth corresponding to a unicast service, and
the second radio frequency bandwidth corresponding to another transmission service that is different from the unicast service; and
communicate, via the network, the electronic program guide content using the first radio frequency bandwidth or the second radio frequency bandwidth,
the electronic program guide content being communicated using the first radio frequency bandwidth when the network congestion has not exceeded a threshold,
the electronic program guide content being communicated using the second radio frequency bandwidth when the network congestion has exceeded the threshold,
the unicast service being disabled when the network congestion has exceeded the threshold.

19. The one or more non-transitory computer-readable storage media of claim 18, where the one or more instructions to determine whether to provide the electronic program guide content include:
one or more instructions that, when executed by the processor, cause the processor to:
determine that the network congestion has exceeded the threshold.

20. The one or more non-transitory computer-readable storage media of claim 19, where the other transmission service comprises a multicast transmission service or a broadcast transmission service.

21. The one or more non-transitory computer-readable storage media of claim 18, where the network condition further comprises a location of the user device relative to a service venue area, and
where the one or more instructions to determine whether to provide the electronic program guide content include:
one or more instructions that, when executed by the processor, cause the processor to:
determine whether to provide the electronic program guide content using the first radio frequency bandwidth or using the second radio frequency bandwidth based on the location of the user device relative to the service venue area.

22. The one or more non-transitory computer-readable storage media of claim 18, where the network condition further comprises a location of the user device relative to a service venue area,
where the unicast service is used to transmit the electronic program guide content to user devices located outside of the service venue area, and
where the other transmission service comprises a broadcast transmission service used to transmit the electronic program guide content to user devices located within the service venue area.

* * * * *